Aug. 24, 1926.

R. M. HEAMES

CHUCK

Filed Nov. 12, 1923

1,597,313

Inventor
R. M. Heames
by W. H. Lieber
Attorney

Patented Aug. 24, 1926.

1,597,313

UNITED STATES PATENT OFFICE.

RICHARD M. HEAMES, OF GROSSE POINTE VILLAGE, MICHIGAN.

CHUCK.

Application filed November 12, 1923. Serial No. 674,102.

This invention relates in general to improvements in devices for temporarily holding similar objects in succession, and relates more specifically to improvements in the construction and operation of mechanisms or chucks for receiving, holding and subsequently releasing successive blanks or the like while the same are subjected to one or more machining operations such as the application of screw threads.

An object of the invention is to provide an improved holding mechanism or chuck which is simple in its construction and efficient in operation.

In the art of threading, pointing and otherwise machining or finishing relatively large and odd size cap screw or bolt blanks and the like in succession, it has heretofore been commercial practice to insert the successive objects in a holder by hand, to perform the specific machining operation desired, and to subsequently manually remove the finished articles from the holder. The prior blank holding mechanisms are extremely objectionable because of the excessive time and manual labor consumed in manually removing each object and also because of their inability to automatically and properly position and hold the blanks while they are being operated upon by the tool.

The present invention is more particularly directed toward improvements in the construction and operation of so called "work" holders for the above described class of service, and has for its object the provision of holding mechanism which aside from requiring the insertion of the successive objects by hand in cases where automatic feeding is not available, is highly efficient and entirely automatic in operation. The improved holder or chuck automatically positions the successive blanks in line with the tool and positively holds the objects in proper position during the machining operation. The improved device furthermore automatically compensates for relative eccentricity or non-alinement of different portions of the blank body, and automatically delivers the finished objects after the machining operation has been completed. Under the present improvement, these beneficial results are accomplished with the aid of a relatively simple and compact mechanism which may be conveniently and safely operated to produce maximum capacity.

While the improvement is described herein in conjunction with a hand fed chuck, it will be obvious that the successive blanks may be automatically delivered to the holder, without departing from the principles of the present invention. The improved mechanism is also capable of utilization for holding objects other than cap screw blanks and in connection with tools for performing various operations.

A clear conception of one embodiment of the present invention and of the operation of devices constructed in accordance therewith, may be had by referring to the drawing accompanying and forming part of this specification, in which like reference characters designate the same or similar parts in the various views.

Figure 1:
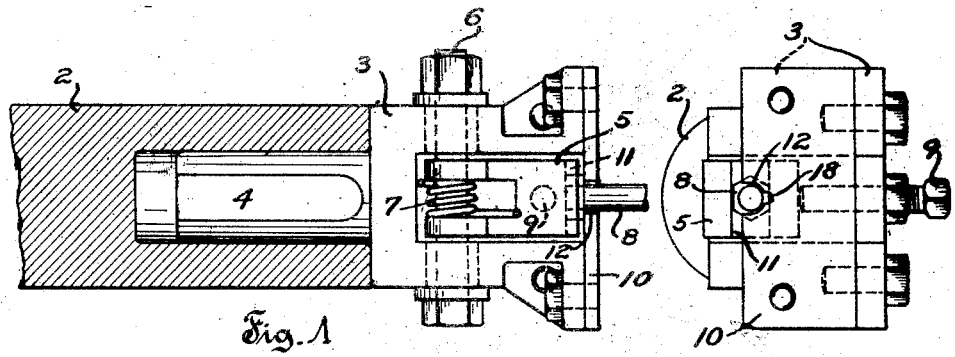
Fig. 1 is a top view of the improved chuck showing a cap screw blank positioned therein preparatory to threading, and also showing a fragmentary section of the chuck carrier.

The improved blank holder or chuck comprises in general a bifurcated chuck frame 3, a tiltable member 5 located between the bifurcations of the frame 3 and supported therefrom by means of a transverse pivot pin 6, a coil spring 7 or equivalent means normally urging the member 5 to swing in one direction relatively to the frame 3 about the pin 6, and a guide element 10 rigidly attached to the ends of the bifurcations of the frame 3. The chuck frame 3 has a rearwardly extending shank 4 adapted for insertion within a socket of the reciprocable chuck carrier 2, a key 17 or other locking means serving to prevent turning of the blank holder relatively to the carrier 2. The carrier 2 is periodically reciprocable either manually or automatically by means of a pinion, not shown, which is engageable with a rack 15 formed in the bottom of the carrier. The carrier 2 and the elements associated therewith are supported by and are movable relatively to the main frame 16 of the machine.

The pivoted member 5 has a vertically swingable forward projection provided with a transverse slot 11 which extends parallel to the axis of the pivot pin 6. The downward movement of the forward projection of the member 5 is limited by means of an adjustable stop 9 secured to the chuck frame 3. The member 5 is also provided with a horizontally swingable lower projection 13 which is adapted to engage the outer extremity of an adjustable abutment 14 secured to the main frame 16, when the carrier 2 and the blank holder are receded as shown in Fig. 4.

The guide element 10 is formed as a flat plate attached directly to the frame 3, and has a recess 12 therein of semi-circular form. A notch 18 at the bottom of the semi-circular recess 12 serves to prevent accumulation of dirt and chips in the recess. The rough or partly finished cap screw blanks 8 are shown in proper position ready for finishing, in Figs. 1, 2 and 3, and a finished cap screw 19 is represented as being ejected from the holder in Fig. 4.

Figure 2:
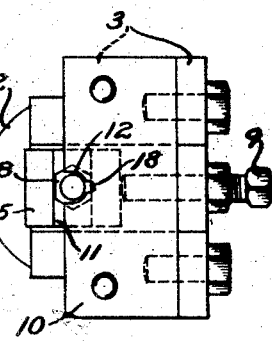
Fig. 2 is a front elevation of the improved chuck showing a cap screw blank held in position preparatory to machining the cap screw shank.
Figure 3:
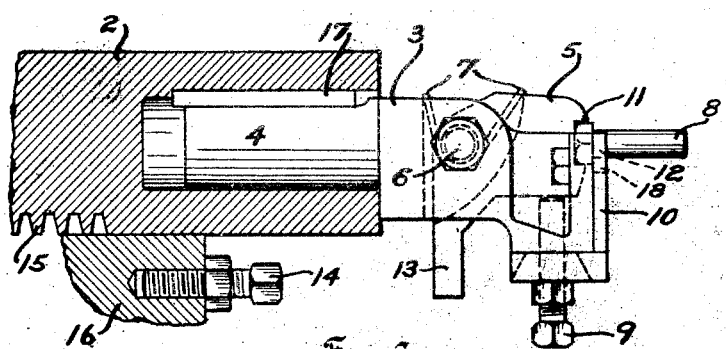
Fig. 3 is a side elevation of the improved chuck showing a cap screw blank in normal machining position, and also showing a fragmentary section of the chuck carrier and supporting frame.
Figure 4:
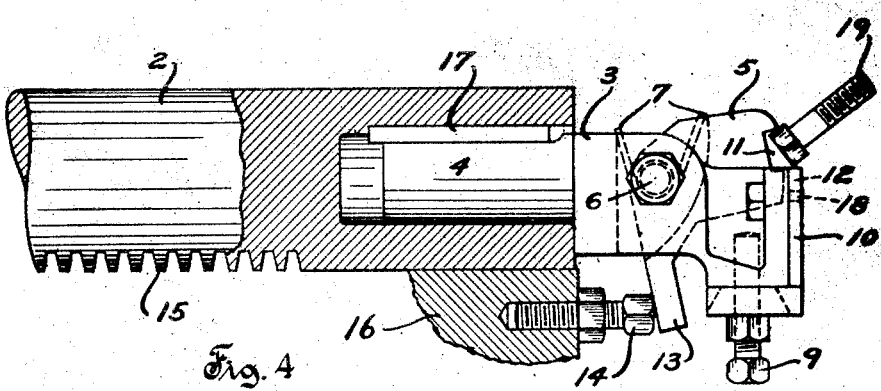
Fig. 4 is another view of the improved chuck showing a finished cap screw being ejected therefrom.

During normal operation of the improved blank holder, the carrier 2 is moved rearwardly either manually or automatically, until the lower projection 13 engages the adjustable abutment 14 as shown in Fig. 4, whereupon the pivoted member 5 is swung in a counterclockwise direction from normal, raising the transverse slot 11 above the top of the guide element 10 and compressing the coil spring 7. With the elements thus positioned, a rough or partially finished blank 8 may be inserted either manually or automatically within the holder, with the head of the blank disposed within the transverse slot 11. As the carrier 2 and the holder are subsequently moved forwardly in any suitable manner, the spring 7 or other urging means automatically becomes effective to swing the member 5 in a clockwise direction until the forward projection of the member engages the adjustable stop 9, and the projection 13 disengages the abutment 14. The shank of the blank 8 is then loosely disposed within the recess 12 of the guide element 10 as shown in Figs. 1, 2 and 3, and the forward projecting extremity of the blank shank is ready for threading or pointing. As the forward movement of the carrier 2 and of the holder is continued, the machining operation is performed. Upon completion of the machining operation, the carrier and blank holder are again moved rearwardly in any suitable manner either manually or automatically. During such receding movement of the blank holder, the lower projection 13 eventually strikes the abutment 14 and quickly tilts the member 5 to the position shown in Fig. 4, thereby causing the inertia of the upwardly moving finished blank 19 to automatically toss the blank clear of the slot 11 and entirely out of engagement with the holding mechanism. This cycle of operations may be quickly repeated to effect rapid successive machining of a series of blanks.

Due to the fact that the diameter of the semi-circular recess 12 is sligthly greater than that of the shank of the blank 8, and that the width of the slot 11 is slightly greater than the corresponding width of the blank head, the blank will be automatically centered during machining operation. The transverse disposition of the slot 11, the looseness permitted between the member 5 and pin 6, the horizontal disposition of the pivot pin 6, and the spring 7 or other resilient restraining means, cooperate to automatically center blanks in which the shank and head are relatively eccentrically disposed. The holding slot 11 positively prevents rotation of the blanks 8 during machining, and the member 5 and element 10 cooperate with the end faces of the head of the blank to prevent endwise shifting of the blank relatively to the holder during reciprocation thereof.

The stop 9 and abutment 14 may be readily adjusted to vary the limits of movement of the pivoted member 5. The element 10 may be readily removed from the frame 3, and the member 5 may be likewise removed by removal of the pivot pin 6. The spring 7 may in some cases be replaced by other resilient urging means, and the action of the spring 7 may even be produced with the aid of gravity alone. It will be obvious that the entire mechanism is extremely simple and compact and performs its several functions positively and automatically. The improved mechanism has been found highly efficient in operation and has produced an output far superior to that of the prior devices of this general character. While the increased output or capacity is partially due to the feature of automatic ejection of the finished blanks, it is also due to the feature of automatic centering and holding of the blanks during the machining operation.

It should be understood that it is not desired to limit the present invention to the exact details of construction and of operation herein shown and described, for various modifications within the scope of the appended claims may occur to persons skilled in the art.

It is claimed and desired to secure by Letters Patent:—

1. In combination, a frame, a member carried by said frame, said member being movable about a pivot and having a slot extending parallel to said pivot, a guide element associated with said frame and having a recess in proximity to said slot, and means for suddenly moving said member to eject a blank from said recess and from said slot.

2. In combination, a frame, means for producing rectilineal movement of said frame, a member pivoted to said frame and having a blank holding slot and means for suddenly arresting the movement of said frame to eject a blank from said slot.

3. In combination, a movable frame, a member movably associated with said frame and having a blank holding slot, means for swinging said member in one direction during movement of said frame to hold a blank, and means for suddenly swinging said member in the opposite direction during movement of said frame to eject a blank.

4. In combination, a reciprocable frame, a pivoted member carried by said frame and having a blank holding slot therein, means for swinging said member in one direction during movement of said frame in a given direction to hold a blank, and means for suddenly swinging said member in the opposite direction during movement of said frame in the opposite direction to eject said blank.

5. In combination, a movable frame, a member movably associated with said frame and having a blank holding slot, resilient means for swinging said member in one direction to hold a blank, and means for suddenly swinging said member in the opposite direction to eject said blank.

6. In combination, a movable frame, a member pivotally supported from said frame and having a blank holding slot extending transversely of the direction of movement of said frame, a spring for moving said member about its pivotal axis, and means for arresting the movement of said member to eject a blank therefrom.

7. In combination, a frame, means for moving said frame, a member pivoted to said frame and having a blank holding slot, and a stationary abutment for arresting the movement of said member to eject a blank from said slot during movement of said frame.

8. In combination, a frame, a member pivotally associated with said frame, adjustable means for limiting the extent of pivotal movement of said member in one direction, and means for suddenly arresting the movement of said member to produce pivotal movement thereof in the opposite direction.

9. In combination, a movable frame, a member pivoted to said frame and having a blank holding slot, means for limiting the movement of said member in one direction, and stationary means for suddenly swinging said member in the opposite direction to eject a blank from said slot during movement of said frame.

10. In combination, a movable frame, a blank holding member movably associated with said frame, and an abutment for suddenly arresting the movement of said member to eject a blank therefrom during movement of said frame.

11. In combination, a movable frame, a member movably associated with said frame, resilient means for moving said member in one direction to hold a blank, and an abutment for moving said member in the opposite direction to eject a blank therefrom during movement of said frame.

12. In combination, a reciprocable frame, a member movably associated with said frame, resilient means for moving said member to hold a blank during movement of said frame in one direction, and an abutment for moving said member to eject a blank therefrom during movement of said frame in the opposite direction.

In testimony whereof, the signature of the inventor is affixed hereto.

RICHARD M. HEAMES.